(No Model.)
F. A. HAKE.
SNAP HOOK.
No. 269,050.
Patented Dec. 12, 1882.
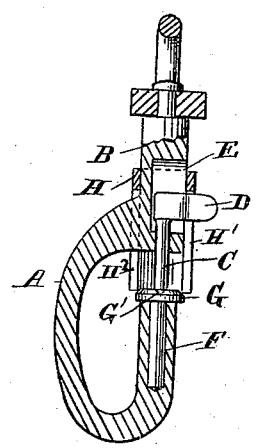
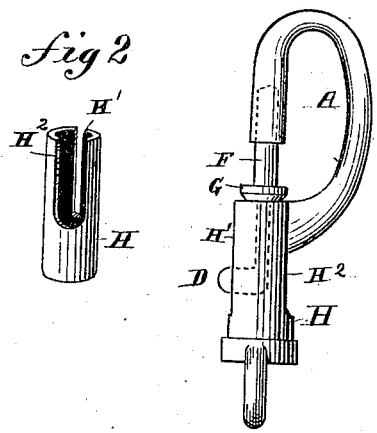
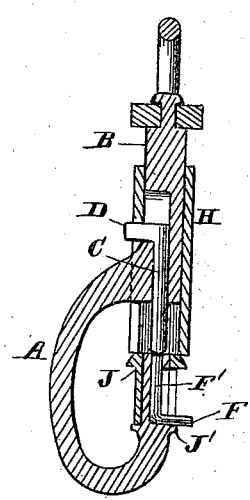
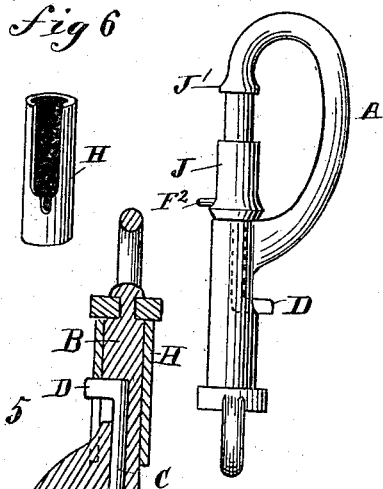
WITNESSES:
INVENTOR:
F. A. Hake
BY Munn & Co
ATTORNEYS.

UNITED STATES PATENT OFFICE.

FRANCIS A. HAKE, OF CUERO, TEXAS.

SNAP-HOOK.

SPECIFICATION forming part of Letters Patent No. 269,050, dated December 12, 1882.

Application filed September 15, 1882. (No model.)

*To all whom it may concern:*

Be it known that I, FRANCIS A. HAKE, of Cuero, in the county of De Witt and State of Texas, have invented a new and Improved Snap-Hook, of which the following is a full, clear, and exact description.

The object of my invention is to provide a new and improved snap-hook for holding rings, loops, &c., and which is constructed without a spring.

The invention consists in a hook provided with a sliding latch on the shank and on the end of the hook, whereby this hook will remain closed in whatever position it is placed.

The invention further consists in sliding bolts and sliding sleeves on the shank and on the end of the hook, whereby double latches will be formed on the end of the hook and on the shank.

Reference is to be had to the accompanying drawings, forming a part of this specification, in which similar letters of reference indicate corresponding parts in all the figures.

Figure 1 is a longitudinal sectional elevation of my improved snap-hook, showing it closed in a position for opening it. Fig. 2 is a perspective view of the sliding sleeve of the same. Fig. 3 is a longitudinal elevation of the snap-hook, showing it inverted and closed. Fig. 4 is a longitudinal sectional elevation of a modification of the same, showing it closed and in position for opening it. Fig. 5 is a longitudinal sectional elevation of the same, showing it opened. Fig. 6 is a perspective view of the sleeve. Fig. 7 is a longitudinal view of the snap-hook, showing it inverted and closed.

The hook A has its shank B recessed longitudinally, and in this recess a bolt or pin, C, slides, which is provided with a lug D, projecting through a longitudinal slot, E, in the shank, by means of which lug D the bolt or pin C can be moved in and out of this apertured shank. The free end of the hook is apertured longitudinally, and contains a longitudinally-sliding bolt, F, provided at its outer end with a head, G, having a central recess, G', into which the point of the bolt C fits. The sleeve H surrounds the shank B, and is provided with longitudinal slots H' and H², in which the lug D and the base end of the hook A can move, respectively. In the modification shown in Figs. 4 to 7, inclusive, the shank B is also apertured longitudinally, and also contains a sliding bolt, C, provided with a handle-lug, D, and is surrounded by a sleeve, H, provided with one longitudinal slot, in which the handle-lug and the base of the hook can pass. The free end of the hook is apertured and contains the sliding bolt F, provided with a handle-lug, F², and is surrounded by a sliding sleeve, J, which rests on the check-collar J', surrounding the hook a short distance from its free end.

The operation is as follows: If the snap-hook shown in Figs. 1 to 3, inclusive, is in the position shown in Fig. 1, the sleeve H and the bolt C can be raised and a ring can be passed in between the lower end of the shank and the free end of the hook, and as soon as the sleeve H and the bolt C are released they drop and close the space between the end of the shank and the end of the hook. If the snap-hook is inverted, as shown in Fig. 3, the sleeve H and the bolt C drop toward the end of the shank, and thus the hook would be opened; but at the same time the sliding bolt F in the end of the hook drops toward the end of the shank, and thereby closes the hook, so that in whatever position the hook is it will always be closed automatically, and can be opened only by holding the hook in such a position that it projects downward, and then raising the sleeve H and the bolt C. The snap-hook shown in Figs. 4 to 7, inclusive, operates in the same manner, with the exception that when the hook is inverted, not only the bolt F', but also the sleeve J, drops and closes the hook, so that in case either one should fail to set, the other would. It will be seen that a characteristic feature of my snap-hook is a longitudinally-sliding latch both in the end of the shank and in the end of the hook, which latch may either be a sleeve or a bolt in the hook or shank.

Having thus described my invention, I claim as new and desire to secure by Letters Patent—

1. A snap-hook made substantially as herein shown and described, and consisting of a hook provided with a sliding latch in the end of the shank and in the end of the hook, whereby the hook will remain closed in whatever position it is, as set forth.

2. The combination, with a snap-hook, of a sliding latch in the shank, and a sliding latch in the hook, and of devices for raising the sliding latch in the shank and in the hook, substantially as herein shown and described, and for the purpose set forth.

3. The combination, with a snap-hook, of sliding bolts in the shank and in the end of the hook, and of sliding sleeves on the shank, and on the end of the hook, substantially as herein shown and described, and for the purpose set forth.

4. The combination, with the snap-hook A, of a sliding bolt, C, in the shank, a lug, D, projecting from this bolt, a slotted sleeve, H, on the shank, a sliding bolt, F', in the end of the hook, and the sliding sleeve J on the end of the hook, substantially as herein shown and described, and for the purpose set forth.

5. The combination, with the hook A, provided with a check-collar, J', of the sliding bolts C and F', the slotted sleeve H, and the sleeve J, substantially as herein shown and described, and for the purpose set forth.

FRANCIS A. HAKE.

Witnesses:
H. STOEVESANDT,
C. E. KAAPKE.